(12) United States Patent
Shipley

(10) Patent No.: US 6,587,600 B1
(45) Date of Patent: Jul. 1, 2003

(54) METHODS AND APPARATUS FOR PRODUCING TOPOCOMPOSITIONAL IMAGES

(75) Inventor: Jim Shipley, Clovis, NM (US)

(73) Assignee: Floor Corporation, Aliso Viejo, CA (US)

( * ) Notice: Subject to any disclaimer, the term of this patent is extended or adjusted under 35 U.S.C. 154(b) by 0 days.

(21) Appl. No.: 09/638,979

(22) Filed: Aug. 15, 2000

(51) Int. Cl.⁷ .................. G06K 9/36; H01J 40/14; G01J 3/28
(52) U.S. Cl. .................. 382/284; 382/108; 382/109; 250/339.07; 356/302; 356/326; 356/451
(58) Field of Search .................. 382/284, 108, 382/149, 294, 109; 73/104, 105; 250/306, 309, 311, 339.07, 458.1, 461.1, 461.2; 356/300, 302, 319, 326, 331, 451, 625, 450, 318, 601

(56) References Cited

U.S. PATENT DOCUMENTS

| | | | | |
|---|---|---|---|---|
| 4,748,335 A | * | 5/1988 | Lindow et al. | 250/572 |
| 4,786,813 A | * | 11/1988 | Svanbrg et al. | 250/461.1 |
| 5,144,833 A | * | 9/1992 | Amer et al. | 73/105 |
| 5,398,113 A | * | 3/1995 | de Groot | 356/497 |
| 5,406,832 A | * | 4/1995 | Gamble et al. | 73/105 |
| 5,479,024 A | * | 12/1995 | Hillner et al. | 250/94 |
| 5,495,109 A | * | 2/1996 | Lindsay et al. | 250/306 |
| 5,918,274 A | * | 6/1999 | Chen et al. | 73/105 |
| 5,981,967 A | * | 11/1999 | Luo | 250/559.4 |
| 6,006,582 A | * | 12/1999 | Bhandari et al. | 73/23.2 |

\* cited by examiner

Primary Examiner—Bhavesh M. Mehta
Assistant Examiner—Kanji Patel
(74) Attorney, Agent, or Firm—Rutan & Tucker, LLP

(57) ABSTRACT

A topocompositional image of an inanimate object or surface can be generated that comprises data that relates to a topographical image, data that relates to a chemical compositional image, and combining such topographical and chemical compositional data to form a composite image. Conceptually a laser or other suitable imaging source that functions to induce both topographical and chemical compositional data directs a laser beam into a scanning optics source. The scanning optics source directs an active beam to a point on a surface. A sensor subsequently collects data and information from the surface by receiving the reflection or deflection of the active beams in order to provide position, chemical compositional and topographical data that represent the interaction of the active beam with a point. Position data, chemical compositional data and topographical data are transmitted along individual feeds to a data analysis component where they are analyzed and combined in order to generate a composite image.

16 Claims, 2 Drawing Sheets

METHODS AND APPARATUS FOR PRODUCING TOPOCOMPOSITIONAL IMAGES

FIELD OF THE INVENTION

The field of the invention is composite imaging of an inanimate surface or object.

BACKGROUND

Geologists and structural engineers study surfaces and surface structure for insight into topography and elemental/molecular composition of a particular surface. The study of surfaces is beneficial for a number of reasons: a) to study contaminants embedded in the surface, b) to study defects in the surface; and c) to study if and how the surface changes over time.

There are a plurality of analytical techniques that are used to study surfaces. Current techniques can be divided into two primary classes: proximate investigation instrumentation and remote investigation instrumentation. Proximate investigation instrumentation (PII) can be defined as that instrumentation that collects surface data from no more than 12 inches away from the surface. Examples of PII techniques are electron microscopes, confocal microscopes, tunneling microscopes, ion sputtering, and some conventional photogrammetry techniques. Remote investigation instrumentation (RII) can be defined as that instrumentation that collects surface data from at least 12 inches away from the surface. Examples of RII techniques are electrochemical sensors, laser photogrammetry, laser-induced fluorescence and atomic-fluorescence spectroscopy.

Proximate investigation instrumentation has several strengths depending on the surface analyzed and the individual technology employed. PII can offer a) nanometer resolution, b) point to point sampling of a surface; and c) possible elemental mapping. Electron and tunneling microscopes are the primary instruments used for proximate investigations. These microscopes perform ideally with small surfaces, characterized by small length and width, as well as small depths of surface contour.

PII suffers from several drawbacks, including a) the requirement of a vacuum, b) charging effects, and c) the lack of translation to more remote surface studies. Several of the proximate investigation instrumentation designs bombard the surface with electron beams or waves. Those beams or waves scatter and become highly inefficient if not utilized under vacuum pressure. Also, in most cases, the surface should be coated with a metal, such as gold, that will minimize charging effects. Finally, since electron beams and waves are most efficient at short distances, PII becomes less efficient and has increased noise levels at more remote distances from the surface of interest.

PII can be versatile, however, in that both surface structure and surface composition can be studied. Electron and tunneling microscopes primarily study the surface structure and can provide, in some cases, images of individual atoms and molecules. However, characterization of the elemental and molecular makeup of the surface takes place by a fundamentally different process. In order to investigate the composition of a surface by PII, a portion of the surface can be sputtered away or ablated for in situ plasma analysis. For a small surface, the ablation technique can significantly change the surface topography on a micrometer and nanometer scale. Thus, although both surface topography and composition can be studied with PII, both may not be conducted simultaneously and without relative significant damage/change to the surface topography.

Remote investigation instrumentation has several strengths depending on the information sought and the technology chosen. RII can offer a) large surface area characterization, b) more preferable atmospheric working conditions; and c) little to no significant surface change in topography or conductivity in most cases. Another advantage is that several of the RII techniques use lasers to produce data because of their highly coherent and directional nature.

RII techniques have been successful, based on the above inherent advantages, in characterizing the surface topography or composition of large surface areas, such as walls, flooring, lakes, ocean water, beach landscape, volcanoes, farms, cities, and desert landscape.

RII techniques suffer some drawbacks, such as the ability to simultaneously integrate real time topography and compositional data. Conventional, as well as laser, photogrammetry is primarily used to collect surface topography data. Photogrammetry, however, does not quantify compositional data. Laser-induced fluorescence and atomic-fluorescence spectroscopy can quantify compositional data, however, neither technology can collect reliable topography data of a surface.

There is still a need, however, for remote investigation instrumentation that is capable of efficiently and simultaneously collecting both topography and compositional data for a specific inanimate surface area.

SUMMARY OF THE INVENTION

A topocompositional image of an inanimate object or surface can be generated that comprises data that relates to a topographical image, data that relates to a chemical compositional image, and combining such topographical and chemical compositional data to form a composite image.

In preferred embodiments, a laser that functions to induce both topographical and chemical compositional data directs a laser beam into a scanning optics source. The scanning optics source directs an active beam to a point on a surface. A sensor subsequently collects the scanning/active beams directed from the scanning optics source to the surface and thus deflected or reflected back to the sensor in order to collect position, chemical compositional and topographical data that represent the interaction of the active beam with a point. Position data, chemical compositional data and topographical data are transmitted along individual feeds to a data analysis component where they are analyzed and combined in order to generate a composite image.

In another aspect of the present invention, a single imaging instrument may be used to induce topographical and/or chemical compositional data or a imaging instrumental configuration comprising two or more individual imaging instruments may be used to induce the topographical and/or chemical compositional data. In preferred embodiments, a single imaging instrument is used to induce the topographical and chemical compositional data. In more preferred embodiments, a laser source is used to induce the topographical and chemical compositional data.

In yet another aspect of the present invention, the topographical and chemical compositional data may be collected simultaneously during the same surface scan or sequentially by scanning the topographical and chemical compositional data separately. In preferred embodiments, the topographical and chemical compositional data is collected simultaneously during the same surface scan.

In one aspect of the present invention, at least one of the topographical image, the chemical compositional image and the composite image may be produced or represented in two dimensions, three dimensions or four dimensions. In preferred embodiments, the topographical image, the chemical compositional image and the composite image are represented in four dimensions: length, width, height or depth and time or change in time.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
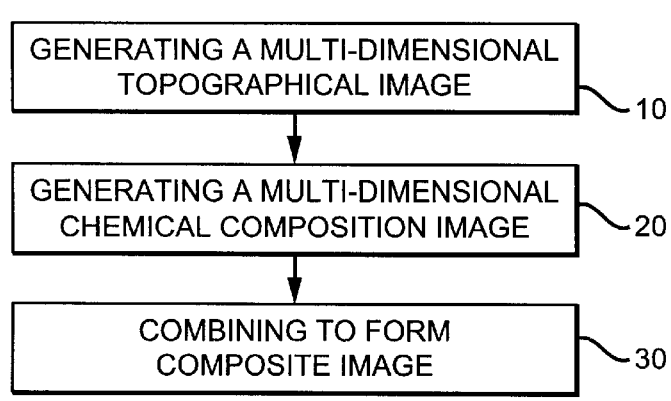
FIG. 1 is a flowchart of a preferred method from claim 1.

As shown in FIG. 1, a method 5 of forming a topocompositional image comprises generating a topographical image 10, generating a chemical compositional image 20, and combining such topographical and chemical compositional image to form a composite image 30.

As used herein the term "topographical image" means an image of a surface of an inanimate object. As used herein the term "surface" means the superficial features of a plurality of atoms or molecules. It is contemplated that the composition forming the surface may comprise a solid, a liquid, or a gas. Examples of a surface may include a city landscape, a volcano, rock formations, carpeting, furniture, walls, flooring, a vapor, a cloud, or water. In a preferred embodiment, a surface comprises a solid, such as a wall, a rock formation, or flooring. In a more preferred embodiment, a surface comprises a wall or flooring.

As used herein, the term "laser" stands for Light Amplification by Stimulated Emission of Radiation, and means a coherent and highly directional radiation source. Lasers commonly utilize a) a gain medium that amplifies light passing through it: b) an energy pump source that creates a population inversion in the gain medium, and c) two reflecting bodies (reflectors) that operate to form a resonant cavity. Examples of lasers include dye lasers, tunable lasers, pulsed lasers, gas lasers, excimer lasers, fiber lasers, diode lasers, free-electron lasers, and solid-state lasers. Examples of dye lasers include continuous wave, excimer-pumped, flashlamp-pumped, nitrogen-pumped, pulsed, doubled-Nd:YAG-pumped, and copper-vapor-pumped. Examples of gas lasers include ion, metal vapor, excimer, far-infrared, mixed gas, carbon monoxide, argon fluoride, argon ion, carbon dioxide, deuterium fluoride, fluoride/fluorine, helium-gold, helium-neon, helium-silver, hydrogen-fluoride, krypton, krypton chloride, krypton fluoride, neon-copper, nitrogen, nitrogen oxide, xenon, xenon chloride, and xenon helium. Examples of excimer lasers include argon fluoride, fluorine, krypton fluoride, xenon bromide, xenon chloride and xenon fluoride. Examples of fiber lasers include continuous wave and laser-pumped. Examples of diode lasers include continuous wave, current-tuned, linear array- quasi continuous wave, temperature stabilized, tunable, visible, AlGaInP/GaAs, GaAlAs/GaAs, GaAlAs, GaAs, InGaAs, InGaAs/InP, and lead salt. Examples of solid-state lasers include color center, flashlamp-pumped, continuous wave, diode-laser-pumped, CW-pumped, pulsed, Cr:LiCAF, Cr:LiSAF, CTh:YAG, Er:YAG, Er:YLF, forsterite, Ho:YAG, $KnBO_3$, KBO, LiF, Nd:glass, Nd:LSB, Nd:YAB, Nd:YAG, Nd:YAG/KTP, Nd:YALO, Nd:YLF, ruby, Th:YAG/Ti:YAG, Ti:sapphire, Tm:LuAG, Tm:YAG, Tm:YLF, and $YVO_4$.

A topographical image may be generated by any suitable imaging means. Examples of such suitable means include conventional photography, digital photography, conventional photogrammetry, Interferometric Synthetic Aperture Radar (IFSAR), Light Detection and Ranging (LIDAR), passive microwave radiometry, digital CCD arrays, or laser photogrammetry. In a preferred embodiment, a topographical image may be generated by digital photography, conventional photogrammetry or laser photogrammetry. In a most preferred embodiment, a topographical image may be generated by laser photogrammetry.

A single imaging instrument may be used to produce topographical data or a imaging instrumental configuration comprising two or more individual imaging instruments may be used to produce the topographical data. In preferred embodiments, a single imaging instrument is used to produce the topographical data. In more preferred embodiments, an imaging instrument comprising a laser source is used to produce the topographical data.

A topographical image may be represented in either three dimensions, four dimensions, or more. If the image is three-dimensional, the three dimensions usually comprise length, width and height or depth. If the image is four-dimensional, the fourth dimension usually comprises time or change in time. It is preferred that the topographical image be represented in four dimensions.

As used herein the term "perspective image" means that image that is generated or collected from a particular position or angle relative to the surface. A perspective image may be generated by collecting an image from above the surface, from the left side of the surface, from the right side of the surface, from the front of the surface, or from the back of the surface. A perspective image may also include the dimension of time as a parameter to the image, along with length, width, height, or depth.

A three- or four-dimensional topographical image may be produced by superimposing at least two two-dimensional or three-dimensional perspective images, or from the generation of a complete three-dimensional or four-dimensional image. It is contemplated that perspective images can be generated from conventional or digital photography. In a preferred embodiment, a perspective image can be generated by a digital camera. It is contemplated that a three-dimensional image can be generated from conventional or laser photogrammetry. In a preferred embodiment, a three-dimensional image or four-dimensional image can be generated by laser photogrammetry.

As used herein the term "chemical compositional image" means a representation of the atomic or molecular composition of a surface. As used herein the phrase "chemical compositional" means any specific chemical component of the surface that contributes to making up the whole surface. It is contemplated that the chemical compositional image may comprise information as specific as particular atoms and molecules in each space scanned, such as titanium, lead, polyimides and silica, or may comprise information as general as the type or classes of molecules in the area scanned, such as amines, alcohols, transition metals or non-metals.

A chemical compositional image may be generated by any suitable imaging means. Examples of such suitable means include laser spectroscopy and atomic spectroscopy. In preferred embodiments, laser spectroscopy comprises laser-induced fluorescence spectroscopy. In other preferred embodiments, atomic spectroscopy comprises atomic-fluorescence spectroscopy. In more preferred embodiments, a chemical compositional image is generated either by laser-induced fluorescence spectroscopy or laser induced breakdown spectroscopy.

A single imaging instrument may be used to produce chemical compositional data or an imaging instrumental configuration comprising two or more individual imaging instruments may be used to produce the chemical compositional data. In preferred embodiments, a single imaging instrument is used to produce the chemical compositional data. In more preferred embodiments, an imaging instrument comprising a laser source is used to produce the chemical compositional data.

A chemical compositional image may be represented in two, three or four dimensions. If the chemical compositional image is represented in two dimensions, the two dimensions may comprise length and width. If the chemical compositional image is represented in three dimensions, the three dimensions may comprise length, width, and either height or depth. If the chemical compositional image is represented in four dimensions, the fourth dimension may comprise time or change in time.

A three- or four-dimensional chemical compositional image may be produced by superimposing at least two two-dimensional or three-dimensional chemical compositional images, or from the generation of a complete three-dimensional or four-dimensional image.

A chemical compositional image can be generated or collected from a particular position or angle relative to the surface. A chemical compositional image may include collecting or generating an image from above the surface, from the left side of the surface, from the right side of the surface, from the immediate front of the surface, or from the immediate back of the surface.

As used herein the term "composite image" means a graphical and compositional representation of a surface. It is contemplated that a composite image is generated from the combination of a topographical image and a chemical compositional image. In preferred embodiments, composite images are generated by combining topographical images with chemical compositional images. In more preferred embodiments, composite images are generated by a pre-combined topographical and chemical compositional image.

A composite image may be represented in either three or four dimensions. If the composite image is represented in three dimensions, the dimensions may comprise length, width, and either height or depth. If the composite image is represented in four dimensions, the dimensions may comprise length, width, height or depth, and either time or change in time.

It is contemplated that "pre-combined" topographical and chemical compositional composite images may be produced through the use of a single instrumentation/laser setup to simultaneously collect both topographical and chemical compositional data. However, it is also contemplated that the composite images may be produced from topographical and chemical compositional images that have been collected at different times other than simultaneous to one another.

Figure 2:
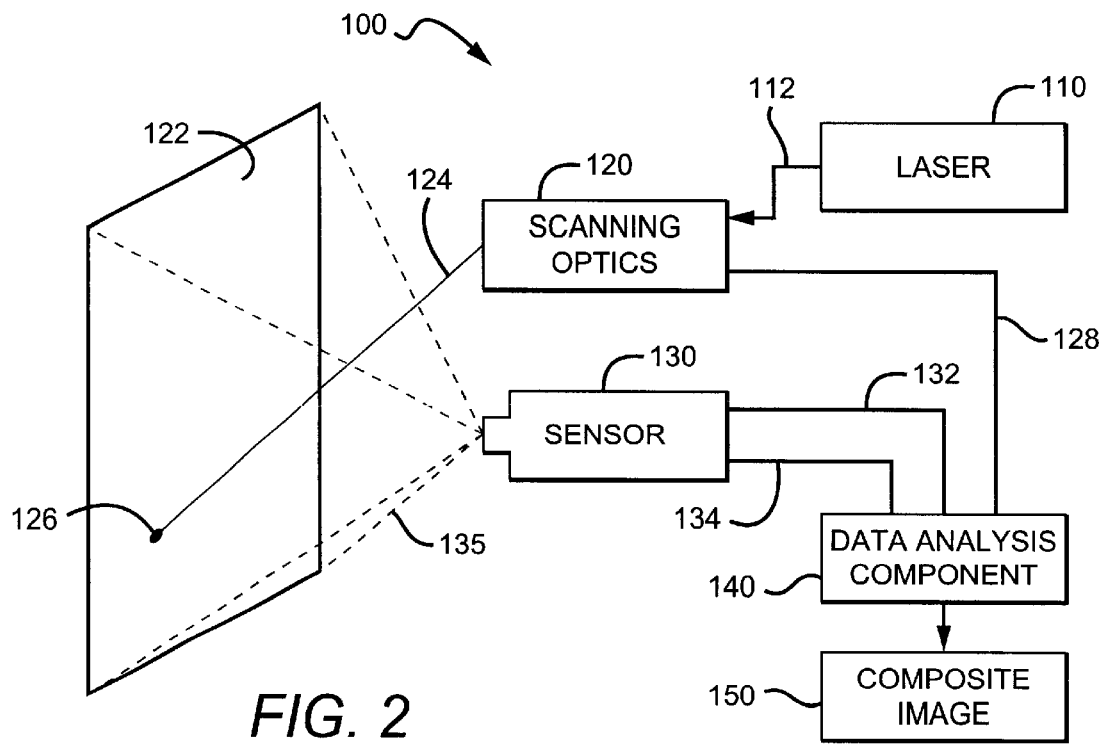
FIG. 2 is a schematic view of a preferred embodiment of an apparatus.

FIG. 2 shows a contemplated experimental setup for forming pre-combined composite images. Laser 110 directs a laser beam 112 into scanning optics 120. Laser 110, including laser beam 112, functions to induce both topographical and chemical compositional data. Scanning optics 120 directs active beam 124 to a point 126 on a surface 122. Sensor 130 collects the reflection or deflection of the active beam from the surface 122 to collect data from the interaction of active beam 124 with point 126. Position data is transmitted along feed 128 to data analysis component 140. Topographical data is transmitted along feed 132 to data analysis component 140. Chemical compositional data is transmitted along feed 134 to data analysis component 140. Data analysis component 140 processes position data, topographical data, and chemical compositional data in order to generate composite image 150.

It is contemplated that a "conventional" topographical and chemical compositional composite image may be produced through the use of a multi-instrumentation/laser setup where topographical and chemical compositional data are individually collected.

Figure 3:
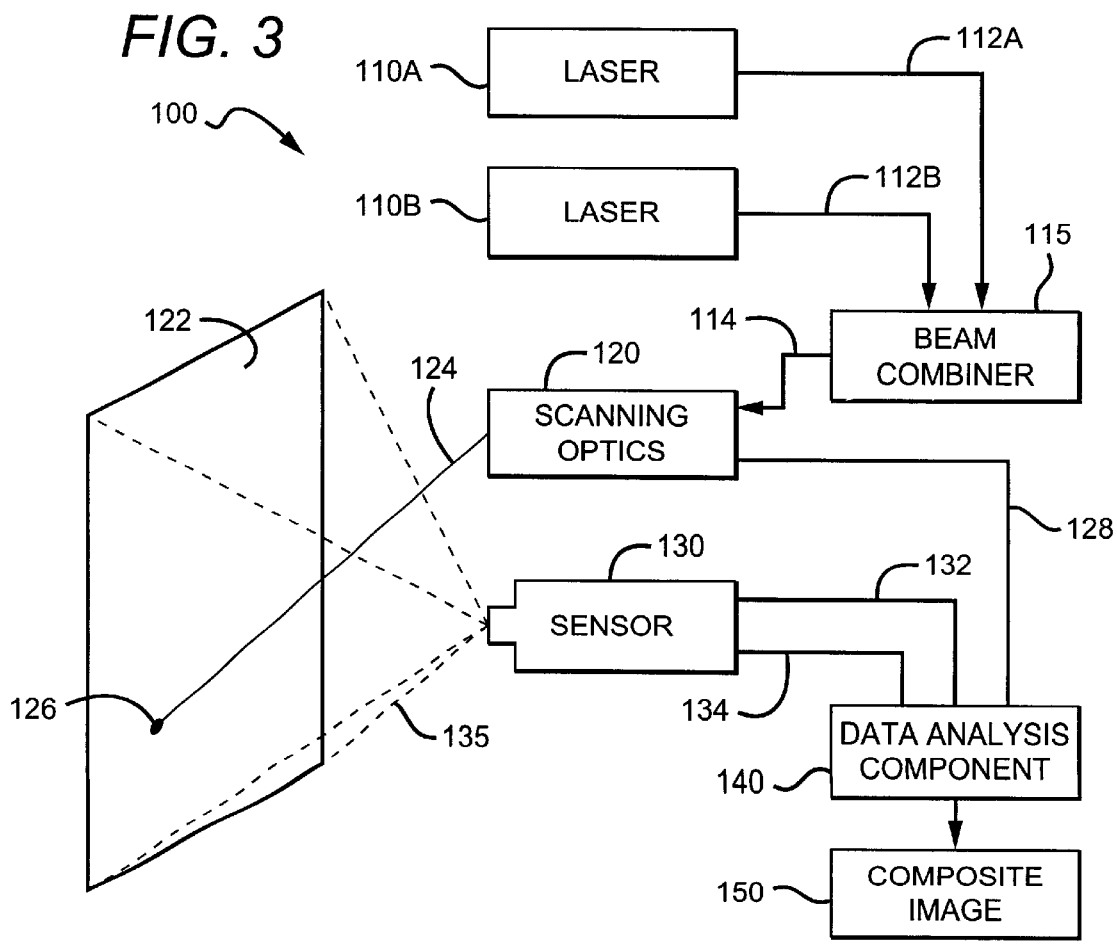
FIG. 3 is a schematic view of a preferred embodiment of an apparatus.

FIG. 3 shows a contemplated experimental setup for forming conventional composite images. Lasers 110A and 110B, including laser beams 112A and 112B, function to induce individually either topographical or chemical compositional data. Beam combiner 115 combines the beams from both Laser 110A and 110B to produce one laser beam 114. Laser beam 114 then enters the scanning optics 120. Scanning optics 120 directs an active beam 124 to a point 126 on a surface 122. Sensor 130 collects the reflection or deflection of the active beam from the surface 122 to collect data from the interaction of active beam 124 with point 126. Position data is transmitted along a feed 128 to the data analysis component 140. Topographical data is transmitted along a feed 132 to the data analysis component 140. Chemical compositional data is transmitted along a feed 134 to the data analysis component 140. Data analysis component 140 processes position data, topographical data, and chemical compositional data in order to generate a composite image 150.

Figure 4:
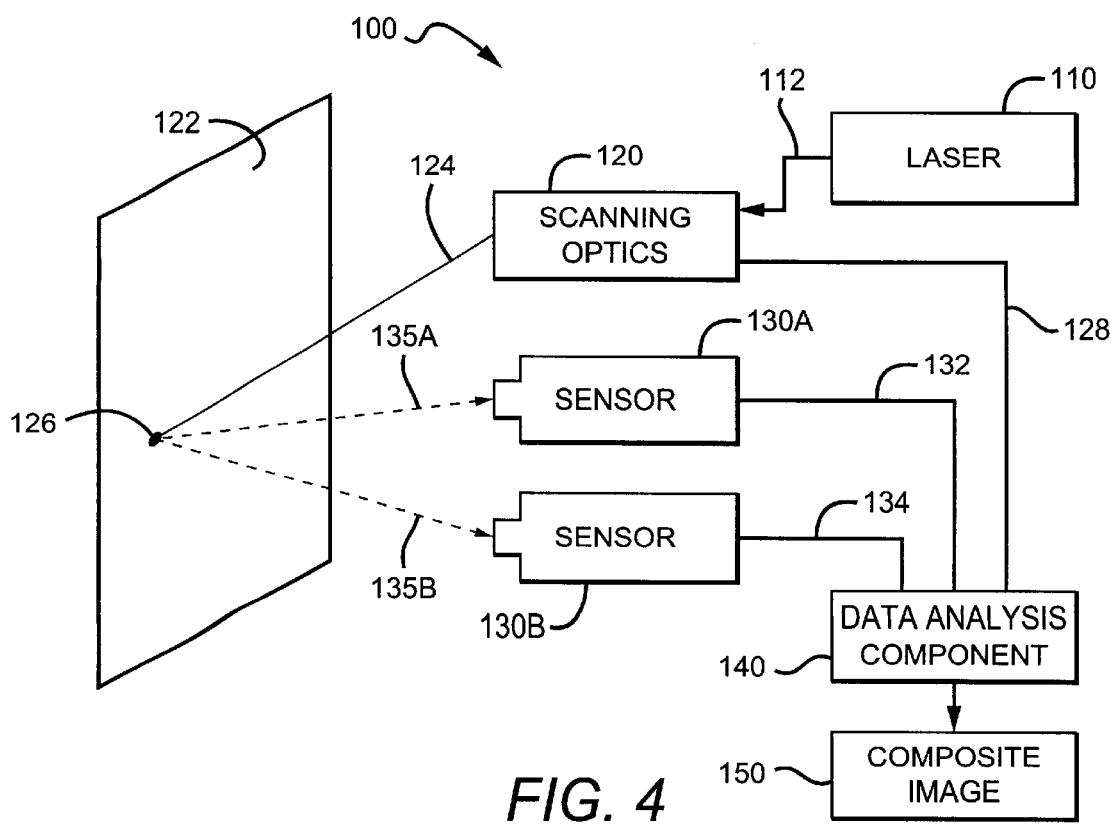
FIG. 4 is a schematic view of a preferred embodiment of an apparatus.

FIG. 4 shows another contemplated experimental setup for forming conventional composite images. Laser 110, including laser beam 112, functions to induce both topographical and chemical compositional data. Laser beam 112 then enters the scanning optics 120. Scanning optics 120 directs an active beam 124 to a point 126 on a surface 122. Sensors 130A and 130B collect the reflection or deflection of the active beams or emissions of those active beams from the surface 122 to individually collect either topographical or chemical compositional data from the interaction of active beam 124 with point 126. Position data is transmitted along a feed 128 to a data analysis component 140. Topographical data is transmitted along either a feed 132 or a feed 134 to a data analysis component 140. Chemical compositional data is transmitted along either a feed 132 or a feed 134 to data analysis component 140. Data analysis component 140 processes position data, topographical data, and chemical compositional data in order to generate a composite image 150.

It is contemplated that the beam combiner 115 can be any suitable instrument that can effectively combine a plurality of laser beams into one coherent beam. It is further contemplated that the beam combiner 115 comprises mirrors, prisms, and/or any other reflective components. In preferred embodiments, the beam combiner 115 comprises a partially silvered mirror.

It is contemplated that the scanning optics 120 can be any suitable optics instrumentation that can sequentially scan a surface 122. In a preferred embodiment, the scanning optics 120 comprises a Raster Scanning Optics Instrument, which can scan one or several active beams 124 linearly across a surface 122.

The surface 122 can be any appropriate surface that can allow a laser beam 112 to provide useful information to the scanning optics 120. In a preferred embodiment, the surface 122 comprises land, water, air, ceramic surfaces, drywall surfaces, glass surfaces, and wood surfaces. In a more preferred embodiment, the surface 122 comprises land, drywall surfaces, and wood surfaces.

The sensor 130 can be any suitable sensing device that is capable of detecting data and emissions from the surface 122. It is further contemplated that the sensor 130 can reliably and accurately detect data and emissions from the surface 122. It is also contemplated that the sensor 130 can be sensitive enough to simultaneously detect strong, as well as weak, emissions from the surface 122. In a preferred embodiment, the sensor 130 can be a plasma sensor, a heat sensor, a photon sensor, or an acoustic sensor. In a more preferred embodiment, the sensor 130 can be a Charge-Coupled device, or an Infrared detector.

Feeds 128, 132, and 134 can be any appropriate coupling line that can transmit data from the sensor 130 to the data analysis component 140, including actual connection lines, wireless "connections" or other suitable coupling methods or means. In preferred embodiments, the feeds 128, 132, and 134 comprise coated metal cords or wireless coupling lines. In more preferred embodiments, the feeds 128, 132, and 134 comprise coated copper or steel cords. It is further contemplated that individual feeds 128, 132, and 134 do not have to comprise the same material as the other feeds.

Data analysis component 140 can be any suitable device that can collect, analyze and possibly store the spectrum of the data from the sensor 130. It is further contemplated that the data analysis component 140 can comprise not only a data collection device, such as a chart recorder or computer, but also a data presentation device, such as a monochromator. In preferred embodiments, the data analysis component 140 comprises a monochromator and a computer. In more preferred embodiments, the data analysis component 140 further comprises appropriate computer software to analyze and report collected data.

Composite Image 150 can be presented in any suitable format, including on a computer screen, on chart recorder paper, on plain paper in black and white or in color, and in a holographic three-dimensional image. In preferred embodiments, the composite image 150 is presented on a computer screen. And in more preferred embodiments, the composite image 150 is presented on plain paper in color or black and white.

Thus, specific embodiments and applications of displays and methods for producing topocompositional images have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of forming a topocompositional image of a remote inanimate object or surface comprising:
    generating a topographical image of the remote inanimate object or surface, wherein generating the topographical image comprises laser photogrammetry;
    generating a chemical compositional image of the remote inanimate object or surface, wherein generating the chemical image comprises laser-induced flourescence spectroscopy; and
    combining such topographical and chemical compositional image to form a composite image of the remote inanimate object or surface.

2. The method of claim 1, wherein generating the topographical image comprises photogrammetry.

3. The method of claim 2, wherein generating the topographical image comprises digital photography.

4. The method of claim 1, wherein generating the chemical compositional image comprises atomic-fluorescence spectroscopy.

5. The method of claim 1, wherein both the topographical image and the chemical compositional image are generated at least partially detecting the emissions caused by applying a laser beam to the object or surface to be imaged.

6. A method of forming a topocompositional image of a remote inanimate object or surface comprising:
    providing an object or surface to be imaged;
    causing a beam to interact with the object or surface to be imaged;
    detecting emissions caused by the interaction of the beam and the object or surface to be imaged;
    using the detected emissions to generate a topocompositional image of the object or surface, the topocompositional image having both topographical and compositional components, wherein both the topographical and compositional components are at least partially determined using the detected emissions.

7. The method of claim 6 wherein the object or surface to be imaged comprises a plurality of points, and the method further comprises sequentially applying a beam to each of the plurality of points and detecting emissions comprises detecting emissions caused by the beam being applied to each of the plurality of points.

8. The method of claim 7 wherein in apparatus comprising scanning optics is used to direct the beam and the apparatus provides position data related to each of the plurality of points, the position data being used to generate the topocompositional image.

9. The method of claim 7 wherein the beam consists essentially of a single frequency of coherent radiation.

10. The method of claim 7 wherein the beam comprises multiple frequencies of coherent radiation.

11. The method of claim 10 wherein emissions caused by a portion of the beam comprising a first subset of frequencies of coherent radiation is used to determine the topographical component of the topocompositional image, and a portion of the beam comprising a second subset of frequencies of coherent radiation is used to determine the compositional component of the topocompositional image.

12. The method of claim 11 wherein each subset of frequencies of coherent radiation is provided by a separate beam source.

13. The method of claim 7 wherein the emissions detected comprise at least one of the following: reflection of the beam; deflection of the beam; fluorescence of the point.

14. The method of claim 7 wherein fluorescence spectroscopy is used to determine compositional components of the topocompositional image, and laser photogrammetry is used to determine topographical components of the topocompositional image.

15. A method of forming a topocompositional image of a remote inanimate object or surface comprising:

providing an object or surface to be imaged, the object or surface comprising a plurality of points;

providing at least one beam source and sequentially applying a beam from the at least one beam source to each of the plurality of points;

using at least one sensor to detect emissions caused by the beam being applied to each of the plurality of points; and using the detected emissions to generate a topocompositional image of the object or surface, the topocompositional image having both topographical and compositional components, wherein both the topographical and compositional components are at least partially determined using the detected emissions;

wherein the object or surface to be imaged at least twelve inches away from both the at least one beam source and at least one sensor.

16. The method of claim 15 wherein detecting emissions caused by the beam is accomplished using at least a first sensor and a second sensor, wherein emissions detected by the first sensor are used to determine the topographic component of the topocompositional image, and emissions detected by the second sensor are used to determine the compositional component of the topocompositional image.

* * * * *

UNITED STATES PATENT AND TRADEMARK OFFICE
CERTIFICATE OF CORRECTION

PATENT NO.    : 6,587,600 B1
DATED         : July 1, 2003
INVENTOR(S)   : Jim Shipley It is certified that error appears in the above-identified patent and that said Letters Patent is hereby corrected as shown below:

<u>Title page,</u>
Item [73], Assignee, replace "Floor Corporation" with -- Fluor Corporation --.

Signed and Sealed this

Seventh Day of October, 2003

JAMES E. ROGAN
*Director of the United States Patent and Trademark Office*